May 11, 1937.  G. INNES  2,080,316
METHOD AND APPARATUS FOR BALING
Filed Oct. 19, 1931  8 Sheets-Sheet 1
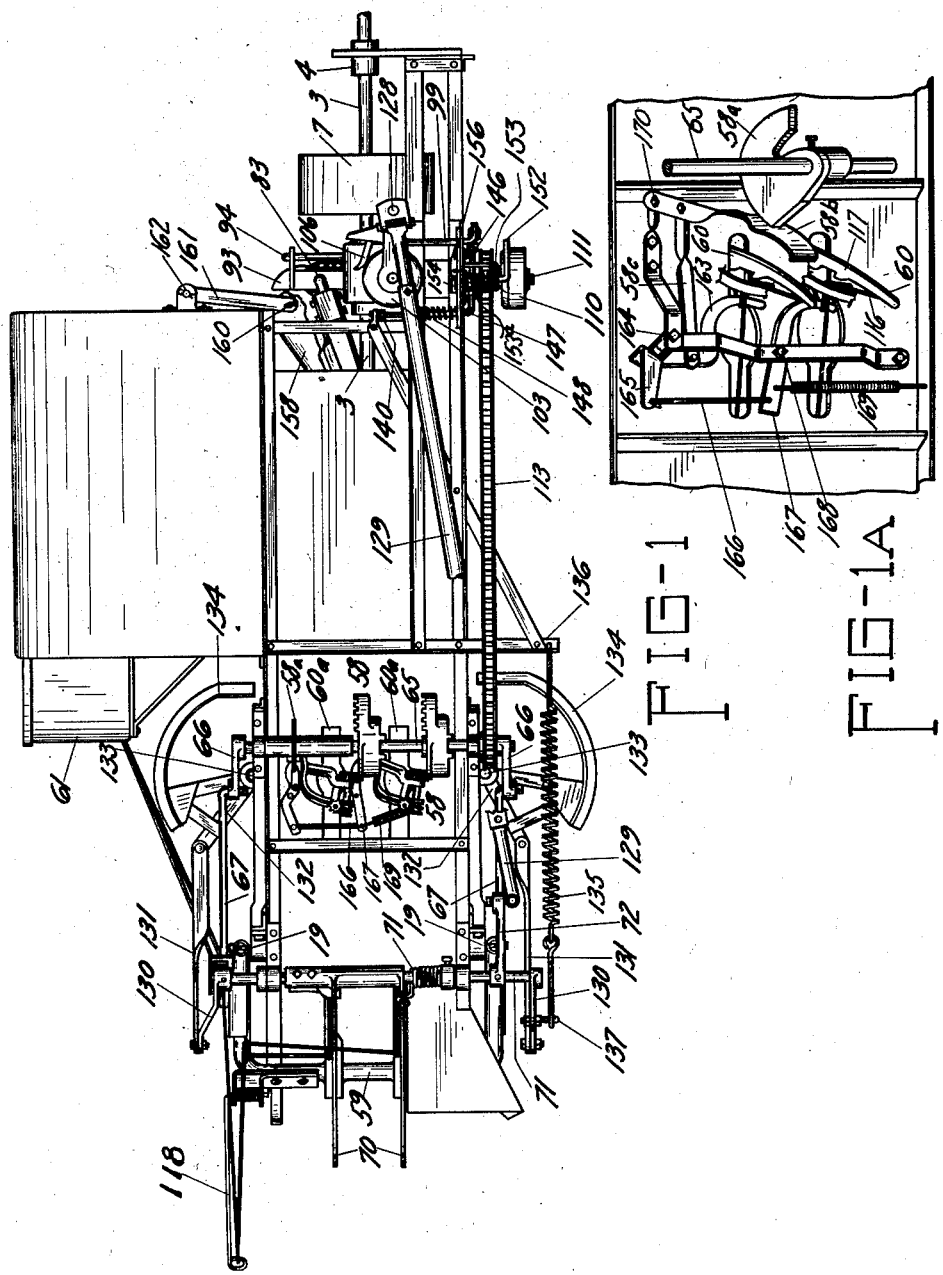
GEORGE INNES INVENTOR.
BY
Merrill M. Blackburn.
ATTORNEY.

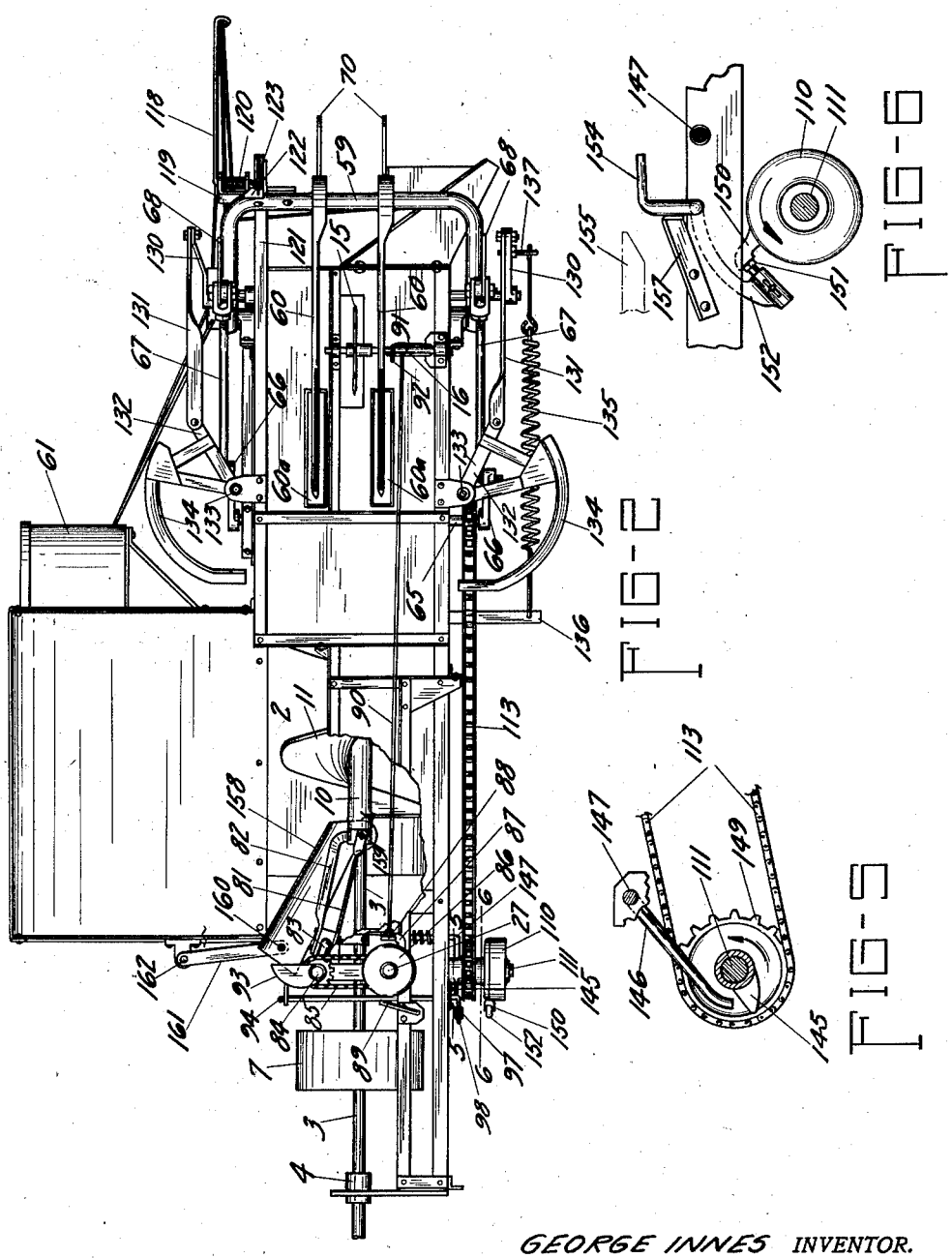

May 11, 1937. G. INNES 2,080,316
METHOD AND APPARATUS FOR BALING
Filed Oct. 19, 1931 8 Sheets-Sheet 3
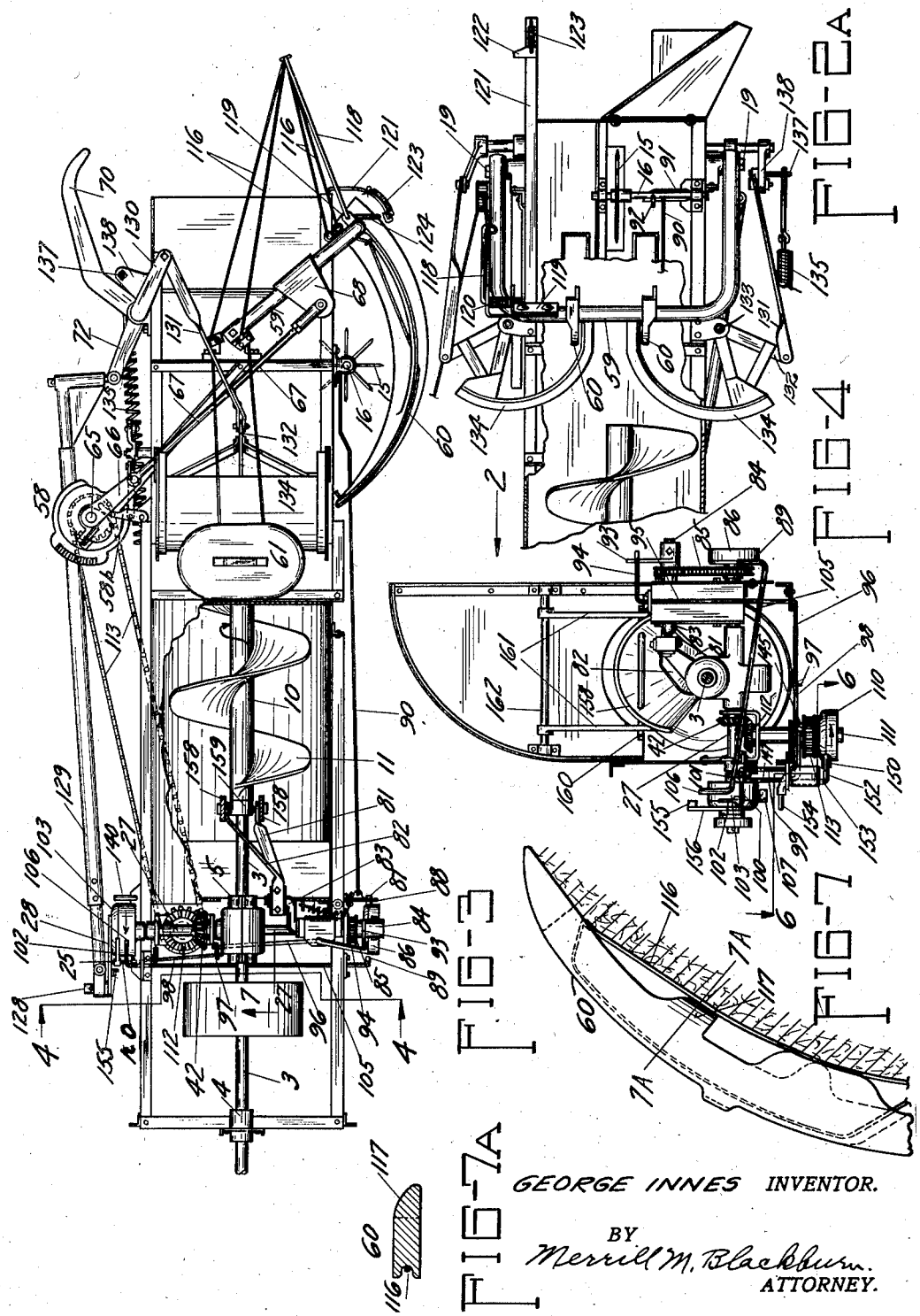
GEORGE INNES INVENTOR.
BY
Merrill M. Blackburn.
ATTORNEY.

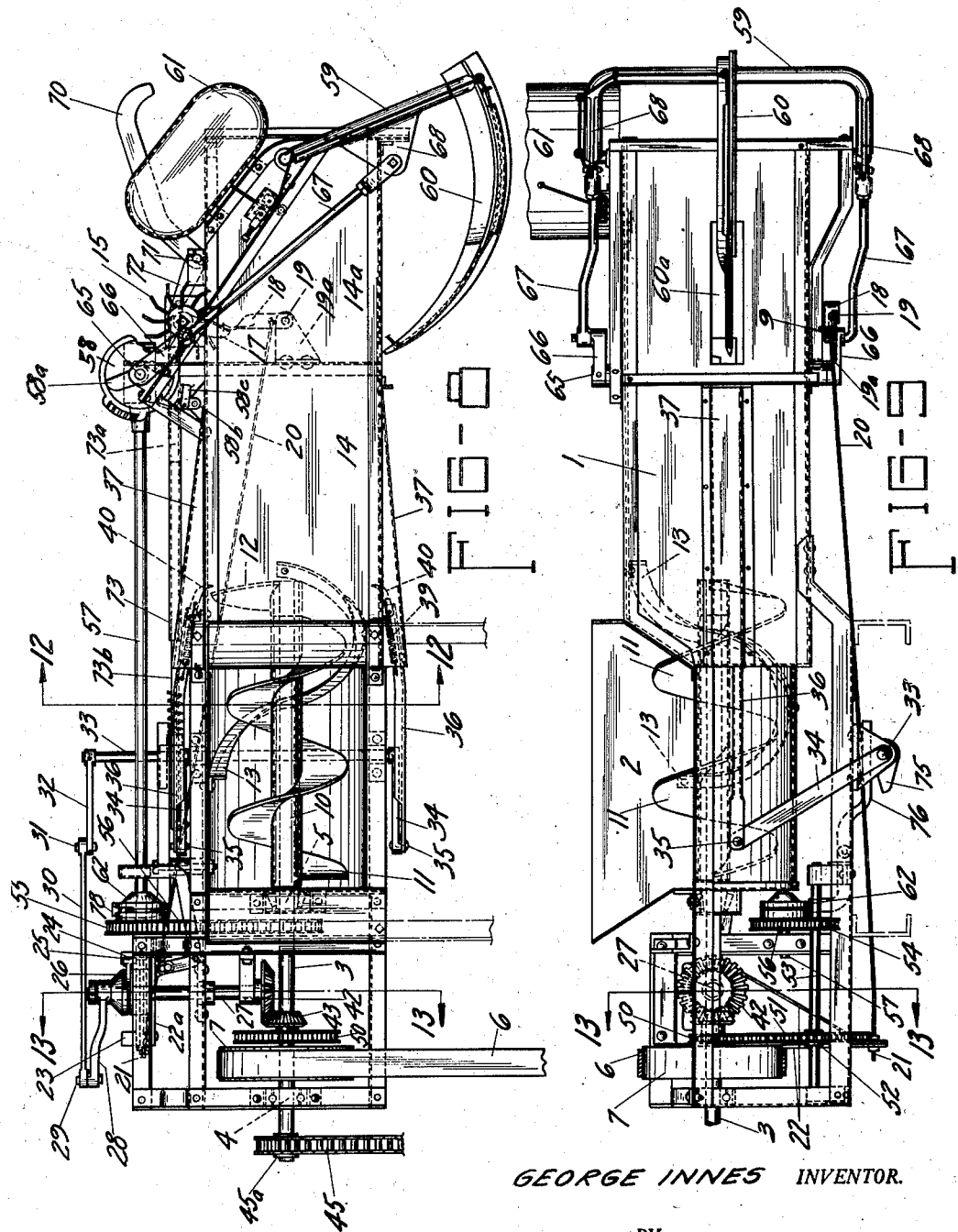

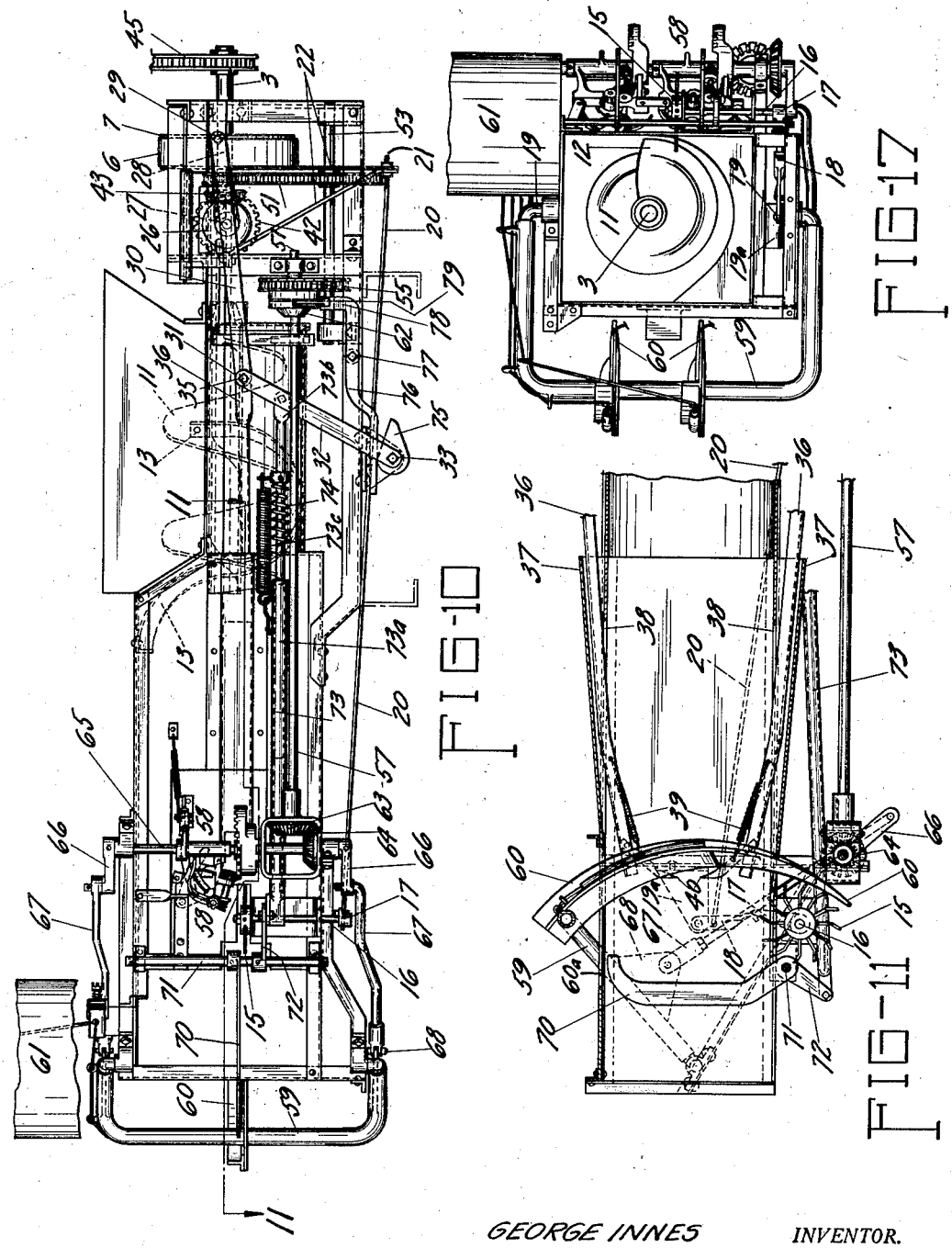

May 11, 1937. G. INNES 2,080,316
METHOD AND APPARATUS FOR BALING
Filed Oct. 19, 1931 8 Sheets-Sheet 6
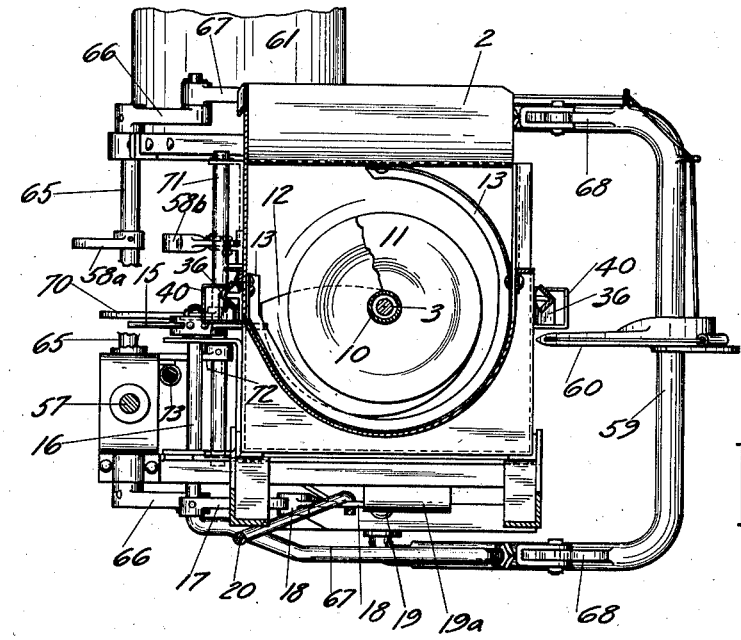
GEORGE INNES INVENTOR.
BY Merrill M. Blackburn
ATTORNEY

GEORGE INNES
INVENTOR.

BY Merrill M. Blackburn
ATTORNEY

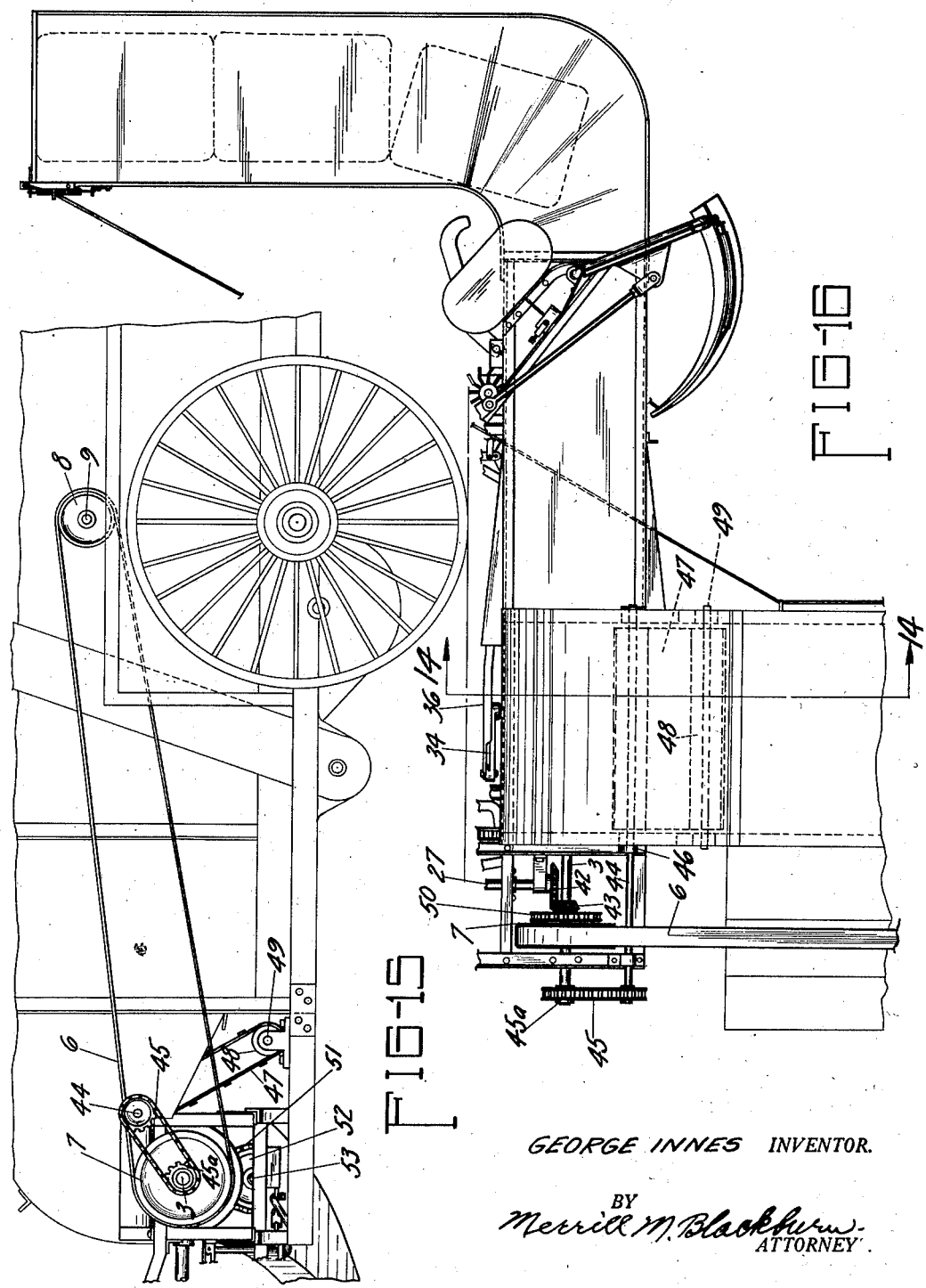

Patented May 11, 1937

2,080,316

REISSUED

UNITED STATES PATENT OFFICE 2,080,316

METHOD AND APPARATUS FOR BALING

George Innes, Davenport, Iowa, assignor to Innes Manufacturing Company, Bettendorf, Iowa, a corporation of Delaware Application October 19, 1931, Serial No. 569,641

25 Claims. (Cl. 100—20)

The present invention relates to a new method of baling loose material such as straw, hay, cornstalks, rice straw, sugar cane, and the like, being concerned more particularly with the baling of vegetable stalks of the character indicated and to mechanism for carrying out the method. While this invention is illustrated in connection with a combined harvester-thresher, I desire it understood that this is merely for the purpose of illustration, my invention being capable of use also with machines sometimes referred to as "stationary threshers". This machine is also adapted to corn harvesters and rice harvesters, as well as for the baling of hay and other small grain stalks than those mentioned above. I shall therefore use the term "stalks baling machine" in a generic sense meaning a machine for baling any of the above mentioned vegetable substances or any others of a similar nature. I also desire it understood that, unless specifically limited by the terms of the claims, they are intended to cover both stationary and portable machines.

In order that there may be no misunderstanding as to the meaning of terms used, certain terms will be defined or explained. The term "combine" is used in its usual trade sense as referring to a combined harvester-thresher. The terms "bundle" and "sheaf" refer to a collection of unthreshed stalks which have been brought together into approximate parallelism and tied with suitable means, such as wire, twine, or other fibrous or stranded material, as has long been done by grain binders, while the term "bale" hitherto has referred to a similarly tied aggregation of stalks having no particular arrangement but generally more or less heterogeneously arranged. In the present instance, the stalks are arranged by the auger as will be referred to hereinafter. These stalks may be either the entire stalks of the vegetable matter, as hay, or may be the straw remaining after grain has been threshed. Grain binders have for many years utilized the idea of binding the grain into bundles for convenience in carrying the grain to places where it is to be shocked and in loading it upon and unloading it from wagons, etc., but straw has not been put into a similar condition for handling as a part of the process of threshing. Combines have always been equipped with means for distributing the straw over the field after the grain has been threshed. This is uneconomical and a great waste since there is much food value in the grain which goes out with the straw and chaff, and in the straw itself. By binding up this straw, chaff and grain, a large percentage of this food value is saved. No device has been heretofore produced which would operate to bale the straw coming from a combine.

Among the objects of this invention are to provide a new method of baling; to provide an improved apparatus for baling vegetable stalks; to provide an improved method of baling straw which will serve also to save the bulk of the chaff and grain which is ordinarily lost when using prior methods of collecting straw; to provide a new apparatus for the baling of vegetable matter which can be manufactured and sold for a fraction of the cost of prior apparatus for similar purposes; to provide a combine equipped with an automatic baler; and such further objects, advantages and capabilities as will hereafter appear and as are inherent in the construction disclosed herein. My invention further resides in the combination, construction and arrangement of parts illustrated in the accompanying drawings and, while I have shown therein what is now considered the preferred embodiment of this invention, I desire the same to be understood as illustrative only and not to be interpreted in a limiting sense.

While I have illustrated in the annexed drawings two main forms of my invention, I prefer that form illustrated on sheets 1, 2, and 3 of these drawings. However, the structure shown in Figs. 8 to 17, inclusive, will first be described, to be followed by a description of the structure shown in Figs. 1 to 6, inclusive.

In the drawings annexed hereto and forming a part hereof,

Fig. 1 is a side elevation of the structure shown in Figs. 2, 3, and 4 as viewed from what will be hereinafter referred to as the left side, that is, the side which will be at one's left hand when facing the end of the machine shown at the right in Fig. 1 and at the left in Fig. 2;

Fig. 1A illustrates in detail a "tucker" used in connection with the needle and knotter, the view being partly in perspective.

Fig. 2 is a broken side elevation as viewed from the right side of the machine, looking in the direction of the arrow 2 in Fig. 4;

Fig. 2A is a fragmentary side elevation of one end of the machine with the parts in a different part of their operative cycle than shown in Fig. 2;

Fig. 3 is a broken plan view looking down upon the top of the structure shown in Fig. 2;

Fig. 4 is a sectional elevation taken substantially along the plane indicated by the line 4—4, Fig. 3;

Fig. 5 is a fragmentary section taken substantially along the plane indicated by the line 5—5, Fig. 2;

Fig. 6 is a fragmentary section taken substantially along the plane indicated by the line 6—6, Fig. 2;

Fig. 7 is a detail of the end portion of the needle;

Fig. 7A is a cross-section taken substantially along the plane indicated by the line 7A—7A, Fig. 7;

Fig. 8 is a plan view of another construction embodying a part of the present invention;

Fig. 9 is an elevation of the structure shown in Fig. 8 as viewed from the right side;

Fig. 10 is an elevation from the opposite side from that shown in Fig. 9, and which will be referred to as the left side;

Fig. 11 is a plan section of the delivery end of the machine, taken substantially along the broken plane indicated by the line 11—11, Fig. 10;

Fig. 12 is a transverse section taken substantially along the plane indicated by the line 12—12, Fig. 8;

Fig. 13 is a section taken substantially along the plane indicated by the line 13—13, Fig. 8;

Fig. 15 is a fragmentary elevation of the structure shown in Fig. 14;

Fig. 16 is a fragmentary plan view of the structure shown in Figs. 14 and 15;

Fig. 17 is an end elevation of a modified form of apparatus for tying the bundles, the same illustrating the use of two needles and two knotter elements.

Figure 14:
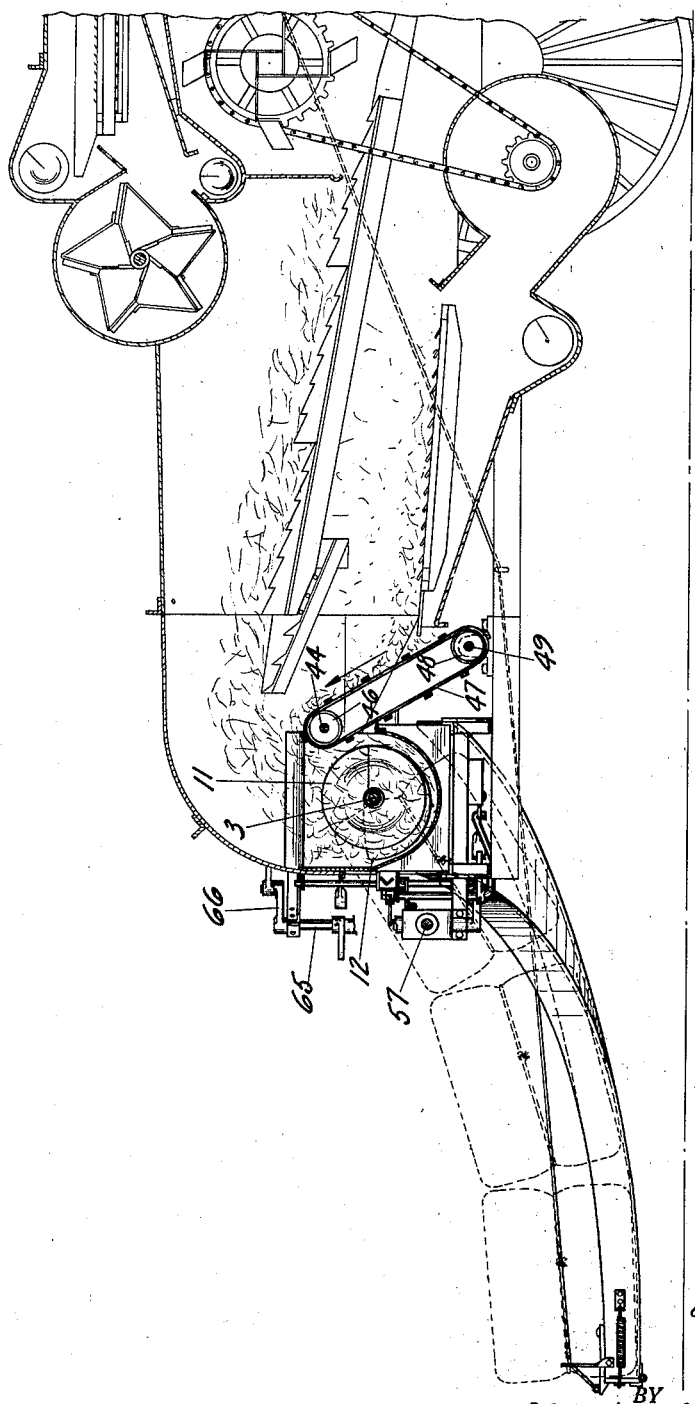
Fig. 14 is a longitudinal section of the straw delivery end of a machine commonly referred to as a "combine" and showing the relationship of my improved apparatus thereto, the same being taken substantially along the plane indicated by the line 14—14, Fig. 16.

Reference will now be made in greater detail to the annexed drawings for the further description of this construction. As illustrated in Figs. 8, 9, and 10, this apparatus comprises essentially a receiving hopper, an auger for arranging and compressing the vegetable matter which is to be baled, a collection chamber, a needle, compressor means, and knotting mechanism. In order to get a preliminary idea as to the functioning of the apparatus, before proceeding with the detailed description thereof, I will outline in a few words what takes place.

First let us assume that we are operating a combine and that the straw is being delivered from the rear end thereof in the usual manner except that the present apparatus is substituted for the straw scattering mechanism quite commonly used with such machines. As the straw is being delivered from the combine, it is fed into the hopper of my apparatus, the auger of which is rotated about its longitudinal axis in the receiving hopper. This auger compels the straw to be delivered into the collection chamber in more or less of a spiral form but distributed well toward the outside of said chamber. Among the straw and chaff fed into this apparatus by the combine, there is more or less of loose grain which is ordinarily lost. In the present apparatus, this loose grain, along with the chaff, is collected amongst the straw and is bound into the bale when the bale is formed and tied. As the straw is forced through the collection chamber, or beyond the baler, while and after being tied, it causes actuation of a tripping mechanism, resulting in the actuation of certain compressing members, herein referred to in connection with Figs. 8 to 17, inclusive, as harpoons or in connection with Figs. 1 to 6, inclusive, as compression jaws. These are pushed forwardly and, as they travel, they push the straw ahead of them and into engagement with a gate. This gate and the harpoons together compress the bale so that the needle may draw the twine tightly around the same, resulting in the latter being tightly bound when released from the apparatus. After the knot is tied, the needle, the gate, and the harpoons return to the positions shown in Fig. 8. However, during the compressing and tying operation, the straw which has been delivered to the receiving hopper has been forced by the auger into the collection chamber, preparatory to the making of the next bale. In the structure shown in Figs. 1 to 6, inclusive, the harpoons are replaced by a different type of compressing members having similar functions As illustrated in the present drawings, this construction comprises an elongated box 1 having at one end thereof a hopper 2 for the reception of the straw, grain, hay, or other vegetable stalks with which the device may be used. As indicated heretofore, this device is illustrated in connection with a combine and the hopper 2 is therefore below the delivery end of the combine, from which the straw is discharged from the machine. A shaft 3 passes through bearings 4 and 5 and is supported thereby to be rotated about its longitudinal axis by the belt 6 passing over the pulley 7, this belt being driven by the pulley 8 mounted upon a driven shaft 9 of the combine. The shaft 3 extends through the hopper chamber and has mounted thereon and suitably secured thereto a tubular member 10 about which is a spiral blade 11. This has a substantially uniform diameter and pitch except at its forward end which is somewhat enlarged, as illustrated in Fig. 8, and may have a less pitch at its forward end than at its rearward end. The purpose of this is to give a decided tendency to the vegetable stalks to be forced to a right angle to the axis of the auger and thus to be put into the bale spirally.

The end of the flight of the spiral conveyor may be sloped backwardly or forwardly as desired so that the bale will not have a tendency to buckle and fall out of the band. A spiral web 13 is secured to the inside of the hopper chamber and partly surrounds the auger, extending into the collection chamber, located just forward from the hopper chamber. This spiral web tends to prevent the vegetable stalks from rotating around with the auger without advancing toward the collection chamber. It also has a tendency to hold the vegetable stalks in contact with the auger so that they will be pushed forward thereby.

The rotation of the auger tends to throw the vegetable fibers into a spiral. Thus the finished bale is similar to a long auger whose flights have been compressed together. Furthermore, a few of the stalks will be arranged at various angles to the spiral layer. Thus, the bale when completed will be quite thoroughly bound together so that there will be little danger of its falling apart.

As the straw collects in the collection chamber 14, (see Fig. 8) it is distributed and packed by the auger 11 and forced past a measuring device 15 (at one side of the tying chamber 14a) which is actuated by the straw or other stalks as they are advanced toward the discharge end. The location of this measuring device 15 is shown most clearly in Figs. 8 and 10. As indicated in the latter figure, this device is carried on a shaft 16 extending vertically at one side of the collection chamber. At its lower end, this shaft carries a tripping dog 17, shown in Fig. 8 as just in the act of engaging the finger 18, pivoted at 19 upon a bracket 19a, and having connection with the link 20 whose opposite end 21 is connected to a bracket 22 (see Figs. 9 and 10) fixedly connected to a slide 22a carrying the stop fingers 23 and 24 (Fig. 8). A clutch operating arm 25, connected with the clutch 26, cooperates with the fingers 23 and 24 to assist in controlling the functioning of the machine, as will be set forth in more detail hereinafter.

The clutch 26 is carried by a shaft 27 which has loosely mounted on the adjacent end thereof a crank arm 28. This crank arm is connected with the clutch 26 so that when the latter is caused to rotate with the shaft 27 it will cause the crank arm 28 to rotate also. This crank arm is connected pivotally at 29 with a link 30 which is in turn pivotally connected at 31 to a crank arm 32 carried by a shaft 33. A pair of crank arms 34 are mounted upon the shaft 33 at opposite sides of the hopper compartment and are pivotally connected at 35 with the rods 36, hereinbefore referred to as the harpoons. As shown most clearly in Figs. 9 and 11, the harpoons 36 extend through guides or covers 37 mounted upon opposite sides of the collection chamber. The latter is provided with openings in its opposite sides for the harpoons to extend through and reciprocate in.

As shown most clearly in Figs. 11 and 12, the forward ends of the rods 36 are chambered on their inner faces for the reception of the springs 39 which are connected at one end to the rods 36 and at the opposite end to the harpoon fingers 40. These fingers thus are drawn inwardly towards each other so as to engage the vegetable matter and force the same forwardly as the harpoons are advanced by rocking of shaft 33 and the crank arms 34. It will be seen from Fig. 8 that, when the harpoons 36 are fully retracted, the fingers 40 are brought back entirely clear of the collection chamber so as to permit the vegetable matter to be pushed forwardly entirely free from any obstruction. While the parts are in the position shown in Fig. 11, the collection chamber is entirely free for the vegetable matter entering the hopper 2 to be forced forwardly by the auger, thus making the device a continuously operating one. The means for operating the shaft 27 and the harpoons 36 consists of a pair of bevel gears 42 and 43 mounted respectively on the shafts 27 and 3. Therefore, since the shaft 3 is operated continuously, the bevel gears will likewise be operated continuously, thus giving continuous rotation to the shaft 27. It will therefore be seen that when the crank arm 28 is clutched to the shaft 27 it will be rotated and the harpoons will be actuated, either forwardly or reversely depending upon that portion of its cycle of operation which the crank arm 28 is making.

A shaft 44 (see Figs. 14 to 16, inclusive) is mounted in the frame work parallel to the shaft 3 and these two shafts have upon their outer ends sprocket wheels over which passes a sprocket chain 45 for transmiting motion from the shaft 3 to the shaft 44. The shaft 44 carries the roller 46 over which passes an apron 47 which also passes about a roller 48 carried by a shaft 49, supported by the framework of the machine.

It will thus be seen that the apron is driven in the direction indicated by the arrow in Fig. 14. The purpose of this apron will be apparent from this figure from which it will be seen that chaff and occasional kernels of grain passing out therewith are delivered to the apron 47 and carried by it into the receiving hopper. Thus the grain and chaff which would otherwise be wasted are put into the bale with the straw. Therefore, substantially the entire nutrient value of the vegetation is being retained for future use.

Another sprocket wheel, indicated by the numeral 50, is mounted on shaft 3 and has a sprocket chain 51 passing thereover and connecting it in driving relation with a sprocket wheel 52 mounted on a shaft 53 and secured thereto. A sprocket 54 is mounted on the shaft 53 and is connected to the sprocket 55 by the chain 56. The sprocket 55 is carried by the knotter shaft 57 which operates a suitable knotter mechanism 58 in which there is no novelty. Any one of several mechanisms may be used for this purpose.

A needle arm 59 is illustrated as being pivotally connected to the top and bottom of the discharge end of the tubular member 1 and is shown as carrying the needle 60 through an opening 60a in the side of the tying chamber. In Fig. 11 the needle 60 is shown as extending all the way through this chamber and as carrying the twine to position to be engaged by the knotter element. An old and well known mechanism is provided in conjunction with the knotter element for carrying the twine to position to be gripped by the knotter. Since this is well known structure, no further mention need be made thereof in this connection, the operating means being indicated in Figs. 8 and 12 by 58a, 58b, and 58c. A twine container 61 is mounted on the discharge end of the baling mechanism adjacent the needle arm and holds one or more balls of twine to be used in tying up the grain, straw, or the like, in a manner already familiar to anyone acquainted with binders. The essential difference between the structure shown in Fig. 17 and that shown in the other figures illustrating this form of my construction is that this structure is provided with a pair of needles instead of one and with a pair of cooperating knotter elements. Also, it will be understood that there will be two twines fed from the twine holder 61, one going to each of the needles 60, a suitable adjustable tension device being provided for each.

Reference will now be made to Figs. 8, 10, and 12 for the description of the operation of the needle. The sprocket 55 runs freely on the shaft 57 except when the clutch 62 is operated to cause clutching of the sprocket to the shaft. When this takes place, the bevel gear 63, carried by the shaft 57, causes rotation of the bevel gear 64, carried by shaft 65, resulting in operation of the knotter mechanism and actuation of the crank arm 66, pivotally connected to the links 67 which are in turn pivotally connected to the brackets 68, integral with or secured to the needle arm 59, and cause actuation thereof. As is well understood, the needle arm 59 dwells for a time in the position shown in Fig. 8 while the vegetable matter collects in the collection chamber preparatory to being pushed out into tying position. In order that the bale may be tied tightly, it is important that it be compressed upon opposite sides. Therefore, I have provided an arm 70, carried by a shaft 71, and arranged to swing in substantially the same plane as the needle. A crank arm 72 is secured to the shaft 71 and therefore actuates this shaft and the outer compressor arm 70 when it is itself actuated by the link 73. This link is made up of a pair of relatively slidable elements 73a and 73b which are drawn toward each other by a spring 73c, as shown clearly in Fig. 10. A heavy spring 74 furnishes resilient compressible means connecting the two elements 73a and 73b so that the compression of the bale will be substantially uniform at all times. The free end of the rod 73b is connected to the crank arm 34 so that it will be simultaneously actuated with the harpoons 36, thus compressing the bale from opposite sides, simultaneously.

Rigidly connected to the shaft 33 is an arm 75 which engages a lever 76 (see Fig. 10), pivoted at 77 upon a convenient portion of the framework of the apparatus. This lever has an arm 78 extending upwardly into proximity to the clutch 62 and the dog 79 of the latter is released by the lever when the crank arm 32 is actuated to cause cam 75 to actuate lever 76. It will thus be seen that, by virtue of the connection of the various parts, their motions will be synchronized so that the parts work in proper sequence.

As shown in Fig. 17, and also in Figs. 1, 2, and 3, this construction may be provided with a plurality of needles 60 and tying mechanisms 58. Since this duplicate structure is no different from and operates in no different way than the single structure described above, with the single exception that it makes use of two twines and puts two bands around the bale, no further description of this feature will be given. Reference is also made to the fact that the needles may be swung in planes passing vertically, or substantially vertically, through the tying chamber. It is not thought necessary to make further reference to such a construction.

Reference will now be made to Figs. 1 to 7A, inclusive, for the description of certain features of the construction which have not been described in the foregoing.

In this construction there are several major departures from the construction already described and chief among these is the arrangement of the auger 11 to reciprocate along the shaft 3. This auger serves to force the stalks into the baling chamber, arrange and compress them therein, and then withdraw so as to permit the grain compressors to swing inwardly and compress the grain sufficiently so that the needles have substantially a clear channel to pass through in tying the bale. These compression members produce a high degree of compression at the lines where the twine is placed, thus insuring that the bands will be tight and that they will not slip off the bale. The reciprocation of the auger is caused by means of links 81 and 82 which are connected to the crank 83, forming a part of shaft 84. On this shaft is a sprocket over which passes the sprocket chain 85, the latter also passing over a sprocket mounted adjacent the right hand end of shaft 27. On the extreme right end of this shaft 27 is a clutch 86 having an arm 87 which engages with a pair of stops 88 and 89. The stop 88 is actuated in one direction by the link 90 which is connected to a lever 91 pivotally mounted upon one side of the machine and engageable by an arm 92 carried by the shaft 16 of the bale measuring device 15. From this it will be seen that each time the device 15 rotates a complete turn, the link 90 will be pulled to remove the stop dog 88 from in front of the arm 87. Clutch 86 will then cause a driving connection between shaft 27 and the sprocket thereon over which the chain 85 passes. Therefore, the crank shaft 84 will be rotated and the crank 83 will cause reciprocation of the auger, as heretofore indicated. This half rotation of the clutch 86 and the crank 83 causes withdrawal of the auger from the grain compressing compartment. Carried by the shaft 84 is a cam 93 which engages the arm 94, rotating the shaft 95 and swinging the arm 96 which is loosely connected at 97 with the arm 98 (see Fig. 4). This latter is integrally connected with the shaft 99 which carries the stop arm 100 with which is connected a spring 101 which serves to swing the arm 100 into position to be engaged by the clutch operating arm 102 of the clutch 103.

The stop arm 88 has been referred to as stopping and releasing arm 87 of clutch 86. The arm 89 is also so positioned that it is engaged by the arm 87 and stops the rotation of clutch 86 after it has travelled a half revolution. This arm 89 (see Figs. 3 and 4) forms a part of or is carried by the shaft 105 suitably mounted in the framework of the machine and is given a partial rotation by the shaft 105 when the latter is moved by the arm 106 when engaged by a projection on the face of clutch 103. When this projection 107 (see Fig. 4) strikes arm 106, shaft 105 is rotated in its bearings, causing stop arm 89 to be carried out of the way of clutch arm 87. The clutch is then permitted to make another half turn, bringing arm 87 into contact with stop 88. During the first half rotation of the clutch 86 and shaft 27, the auger is withdrawn to the position shown in Fig. 2A by the links 81 and 82 and, during the second half rotation of the clutch and shaft, the auger is moved forwardly to the position shown in Fig. 3.

In Fig. 4 is shown somewhat in detail the control mechanism for a clutch illustrated in Fig. 2. This clutch 110 is mounted on the lower end of shaft 111. A gear 112 on the upper end of this shaft meshes with gear 42 on shaft 27. This connection serves to drive the shaft 111 and, from this, through clutch 110, the chain 113 is driven. This chain passes over a sprocket wheel mounted on the shaft 65 and causes actuation thereof. This shaft serves as the driving means for the knotter mechanism and carries at its two ends the cranks 66. The connection to and operation of the needles will be obvious from the description given above in connection with Figs. 8 et seq. The needles used in my construction differ somewhat from the accepted form for same in that there are projections on the inner side of each needle which tend to hold the twine away from the body of the needle and permit the tucker to get hold of the twine 116, the latter being held away from the inner face of the needle, as illustrated in Fig. 7. Fig. 7A shows that the top of projection 117 is bevelled or curved to cause the twine to slide over the top face of the needle, in position to be engaged by the tucker.

An arm 118 is pivotally mounted in the bracket 119 carried by the needle arm 59. A spring 120 tends to swing the arm 118 into the extended position illustrated in Fig. 3 and thereby keeps the twine taut enough so that it will not drop down from being loose. This always keeps the twine up in proper position. As the straw is packed in, preparatory to the tying of the bale, the twine is drawn in through the needle and this causes the arm 118 to swing inwardly toward the arm 59. However, it is not the intention to have the spring 120 strong enough to place on the twine all the tension necessary in the tying of the bale. The tension is merely enough to hold the stalks forming the forward part of the bale in position until enough of the bale has been formed to maintain itself while the operation is being completed. The amount of twine drawn out by the arm 118 is preferably between one-fourth and one-half enough for the tying of the bale, the remainder of the twine being drawn out by the bale as it is built up. An arm 121 projects outwardly from the frame of the machine and has a dog 122 pivoted thereon, said dog being actuated by means of a spring 123, as is apparent from Figs. 2A and 3. The arm 118 has a short arm 124 projecting therefrom which engages with the dog 122 to cause outward swinging of the arm 118, as illustrated in Fig. 3. It will be obvious that when the surplus twine 116 is taken up and the arm 118 is swung in close to arm 59, arm 124 will be swung past dog 122 and will be in such position that when the needle goes in for the tying of the bale, the end of arm 124 will engage the dog 122 and cause it to be turned on its pivot, stretching the spring 123. When the needle 60 swings in the opposite direction, toward the position illustrated in Fig. 3, the end of the arm 124 engages the dog 122 and this causes the arm 118 to swing forwardly into the position illustrated in Fig. 3, thus drawing out twine for the starting of the next bale, though the amount drawn out may be regulated by adjusting the length of the arm. A bale is not discharged immediately upon completion but is retained in position to serve as an abutment for the next bale during at least the early part of the process of formation thereof.

We will now turn to clutch 103 in the upper left portion of Fig. 3 and the lower left portion of Fig. 4. The crank arm 28 is carried by the loose part of the clutch 103 and has a crank pin 128 on its outer face which is connected in driving relation with the link 129. It will therefore be apparent that as the clutch is driven by the shaft 27, the link 129 will be caused to reciprocate, thus transmitting motion to the crank arm 72, the outer compressor arm 70, and the crank arm 130. Links 131 connect the crank arms 130 to the crank arms 132 which turn about the shafts 133 (see Fig. 1). Stalks compressor elements or jaws 134 are actuated by the cranks 132 and swing into position between the needles 60, as illustrated in Fig. 2A. A strong spring 135 is anchored at one end to a frame element, as shown at 136, and at its opposite end is connected by an eyebolt 137 or otherwise to the crank arm 130. As shown in Fig. 3, this crank arm has a projection from one side thereof, denoted by the numeral 138, to which the eyebolt 137 is connected. As the outer compressor arms 70 swing inwardly, the link connecting spring 135 to eyebolt 137 passes the end of shaft 71. When this happens, the spring is at its greatest operative length and it tends to shorten as the arms 70 continue to swing inwardly. This spring 135 therefore assists in swinging the arm or arms 70 in to compress the bale, and, at the same time, helps to swing compressors 134 in against the stalks to complete the compressing thereof preliminary to tying.

We will now return again to clutch 103 and we see that as this clutch rotates with the shaft 27, the dog 102 strikes the stop 140 and releases the clutch so as to disconnect the driving relation between the clutch parts. When this happens, the link 129 stops, leaving the compressor arms 70 in their innermost position. It will be seen that at the same time the gates or compressor members 134 will be in the positions shown in Fig. 2A and the bale will be fully compressed. At this time, the needles 60 pass in through the openings 60a carrying the twine to the knotters so that the bale will be tied. Just as the gate or compressor members start to come in, the auger is withdrawn so as to clear the space for the inward swinging of the compressor members. In the relative positions occupied by the compressor members and the needles, substantially all of the straw will be out of the way of the needles so that they will have a substantially clear path through the chamber and there will be very little resistance to the passage of the needles to the tying position.

Release of the clutch dog 102 from stop 140 is accomplished by a cam 145 striking arm 146 which is integral with or connected to shaft 147, of which stop 140 forms a part. A spring 148 actuates stop 140 into stopping position. It will be seen from Figs. 2 and 5 that cam 145 is carried by shaft 111 which also has mounted thereon the sprocket 149 over which passes the chain 113, referred to above. In a casing surrounding shafts 3 and 27 is a worm gear connection between these shafts, and it will therefore appear that shafts 27 and 111 rotate simultaneously with shaft 3. From these three shafts all the operative mechanism is driven.

Reference will now be made to Fig. 6 in describing the operation of clutch 110 which controls the operation of chain 113 and shaft 65 by which the binding mechanism is actuated. The clutch 110 has a dog 150 which engages a spring cushion stop 151, carried by arm 152 of shaft 153. At its opposite end this shaft has an angular arm 154 to be engaged by a projection 155 on an arm 156. A stop 157 limits the swinging of arm 152 in one direction. A spring 153a coiled about shaft 153 serves to normally retain stop 151 in stopping position.

A guard 158 is secured to the collar 159 connected to sleeve 10 and therefore reciprocates therewith as the auger is moved back and forth. The opposite end of the guard is suspended by any suitable means, shown as a shaft 160 passing through a pair of arms 161 suspended from a shaft 162 (see Fig. 4). This mounting permits the guard to reciprocate freely with the auger. It is apparent that the guard will prevent the accumulation of stalks upon the shaft 3 and links 81 and 82.

Reference has been made above to a tucker and this is common to both of the structures illustrated in Fig. 1 and Fig. 10. However, in Fig. 1A this has been illustrated in connection with the double form shown in Fig. 1. In Fig. 1, the cam 58a is shown in edge view while, in Fig. 1A, it is shown in perspective and as being carried by the shaft 65. This cam cooperates with the lever 58b in actuating the link 58c which is connected to the tucker hook 163 pivoted upon the bolt 164. An arm 165 is rigid with the hook 163 and from this extends a link 166, the latter being operatively connected with the other tucker hook 167 to cause oscillation thereof about its pivot 168. A spring 169 causes movement of these hooks about their respective pivots into inoperative positions. When the needles 60 come into tying position, the cam 58a comes around and engages lever 58b, rocking same about its pivot 170 and causing the tucker hooks 163 and 167 to swing downwardly and forwardly closely adjacent the needles 60 to pick up the twines 116 and carry them close to the knotters where they will be engaged and tied, in the customary manner. Reference has been made above to projection 117, shown in Fig. 7, and, in this figure, it will be seen how this projection and the one adjacent it hold the twine 116 away from the inner face of the needle, even when the stalks are pressing tightly against the twine. The hooks 163 and 167 preferably swing in between these two projections.

*Operation*

The cycle of operation will be next taken up and explained in connection with Figs. 1 to 6, inclusive. We will assume the parts to be in the positions illustrated in Figs. 1, 2, and 3 and that the drive belt 6 is driving pulley 7 and shaft 3. Now if vegetable stalks enter the receiving hopper, they will find their way to the auger 11 and will be pushed forwardly thereby into the collecting chamber where they will be given a spiral arrangement by virtue of the rotation of the auger 11. These stalks will be piled up against the twines 116 and the building up of the bale will commence. As the bale is formed, it is pushed past the metering device 15 and the trip 92 turns around with the shaft 16 until it moves the lever 91 far enough to release the stop 88 from the dog 87, thus permitting the clutch 86 to function. As a result of this, chain 85 is driven and this results in rotation of shaft 84. Rotation of this shaft causes retraction of the auger 11, thus making room for the compressors 134 to swing in from above and below, as indicated in Fig. 2A, so as to place pressure upon the bale closely adjacent the parts where the needles are to pass through in carrying the twine around the bale. As indicated heretofore, the shaft 27 rotates continuously with the shaft 3, thus furnishing rotary motion to the clutches 103 and 110. Rotation of the shaft 84 causes the trip 93 to actuate the train of connection comprising 94, 95, 96, 97, 98, 99, and 100, thus releasing the dog 102, and throwing in the clutch 103 to cause the driving of the crank arm 28 and the link 129. Actuation of this link causes the arm or arms 70 to be swung inwardly against the end of the bale. Simultaneously with the swinging of these arms, the crank arms 130 are turned and the links 131 cause the compressor members 134 to be swung inwardly, as indicated in Fig. 2A.

When dog 87 is released, clutch 86 turns one-half rotation until the dog strikes the stop 89. This disconnects the clutch and stops the driving of the shaft 84, leaving the auger in retracted position. However, clutch 103 continues its rotation and the projection thereon, which cooperates with arm 106, causes the rocking of this arm and of shaft 105, which results in stop 89 being withdrawn from in front of dog 87. This will permit the completion of rotation of the clutch 86 and shaft 84, carrying the auger 11 back into position to cause arranging and compressing of the vegetable stalks.

At just about the time the compressors 134 have reached their innermost limits, the projection 155 on arm 156 engages arm 154 and causes stop 151 (see Fig. 6) to be retracted from in front of dog 150. This permits clutch 110 to function and to cause driving of chain 113 which, as will be seen from Fig. 3, causes operation of the knotting mechanism 58, shaft 65, and the needle mechanism connected thereto, which results in the twine being carried across the back face of the bale and tied so as to complete the baling operation. The needles 60 are actuated by shaft 65 and enter the baling compartment while the compressors 134 are holding the stalks compressed and they are withdrawn before the auger is again moved forward.

With completion of the bale tying operation and withdrawal of the needles, the compressors 134 and arms 70 are returned to inoperative position, illustrated in Fig. 2. The actuation of the needles and knotters requires but a single tripping of clutch 110, while cycles of auger 11 and members 70 and 134 require two trippings of clutches 86 and 103, respectively.

Having now described my invention, I claim:

1. A structure for the purpose indicated, comprising a receiving chamber for vegetable stalks, an auger mounted therein to rotate about a longitudinal axis, means for reciprocating said auger longitudinally of said axis, a chamber to receive the stalks forced forwardly by said auger, means operating in conjunction with the second mentioned chamber to compress said stalks, and means for tying said stalks into a bale.

2. In a mechanism for the purpose indicated having a bale forming and tying compartment, a needle carrying arm functioning in cooperation with said compartment, a twine drawing arm pivotally carried by the needle arm, means for resiliently swinging the second mentioned arm in one direction, and means for positively swinging it in the opposite direction.

3. In a baling apparatus, a receiving compartment for stalks, a rotary shaft extending longitudinally thereof, an instrumentality longitudinally slidable on said shaft, said instrumentality having a spiral flight forming a part thereof and serving to arrange the stalks spirally in the bale as the latter is formed, and means for rotating said shaft and flight.

4. In a baling apparatus, a receiving compartment for stalks, a rotary shaft extending longitudinally thereof, an instrumentality longitudinally slidable on said shaft, said instrumentality having a spiral flight forming a part thereof and serving to arrange the stalks spirally in the bale as the latter is formed, and means for reciprocating said flight.

5. A structure for the purpose indicated, comprising a receiving chamber for vegetable stalks, an auger mounted therein to rotate about a longitudinal axis, means for reciprocating said auger longitudinally of said axis, and a chamber to receive the stalks forced forwardly by said auger.

6. A structure as defined by claim 4 having a guard for preventing accumulation of stalks upon the flight reciprocating means, said guard being carried by the wall of said compartment and extending over the rotary shaft.

7. A baler for use in combination with a combine, comprising a receiving compartment, a rotary shaft extending longitudinally thereof, a spiral member on said shaft for causing stalks received in said compartment to be advanced to and out of one end thereof, means for rotating said shaft and spiral member, a baling chamber at the end of the receiving compartment, actuating mechanism for reciprocating said spiral member along said shaft, and a guard for said last named means to prevent accumulation thereon of stalks entering said compartment.

8. A structure as defined by claim 7 having compressing means in connection with said chamber for compressing the stalks, chaff and grain into a bale just prior to the tying operation.

9. A structure as defined by claim 7 having means for causing functioning of the actuating mechanism for the spiral member to cause same to be withdrawn from the discharge end of the compartment just prior to the tying of the bale.

10. A baler for use in combination with a combine, comprising a receiving compartment, a rotary shaft extending longitudinally thereof, a spiral member on said shaft for causing stalks received in said compartment to be advanced to and out of one end thereof, means for rotating said shaft and spiral member, a baling chamber at the end of the receiving compartment, compressing means in connection with said chamber for compressing the stalks, chaff and grain just prior to the tying operation, means for causing the spiral member to be withdrawn from the discharge end of the compartment just prior to the compressing action of the compressing means, and mechanism causing the parts to operate in timed sequence.

11. A structure as defined by claim 10 having a needle for carrying the twine around the bale, and a twine drawing arm pivotally mounted in connection with said needle to draw out twine so as to reduce the tension on the twine during the first part of the bale forming operation and then permit the twine to be drawn through the needle and tension mechanism as the stalks are added to the partly formed bale.

12. In baling apparatus for vegetable stalks, the combination of a baling chamber, a rotary feeding member to force the stalks to be baled into said chamber, means to longitudinally reciprocate said feeding member, and mechanism mounted in connection with said chamber and functioning automatically to tie said stalks into bales.

13. In a baling apparatus, a receiving compartment for stalks, a shaft extending longitudinally thereof, instrumentality longitudinally slidable on said shaft, and means for sliding said instrumentality on said shaft a predetermined distance by moving same reciprocably to compress the stalks, said instrumentality being rotatable and serving to arrange the stalks in the bale as the latter is formed.

14. In a baling mechanism, a bale forming and tying compartment, a receiving compartment for the material to be baled, an auger in the last named compartment to move the said material forwardly into the first named compartment and arrange it therein spirally, said auger serving to exert pressure upon the material being baled, functionally cooperative means for applying additional pressure longitudinally against an end of the bale, and means for tying the bale.

15. In a baling mechanism, a bale forming and tying compartment, a receiving compartment for the material to be baled, an auger in the last named compartment to move the said material forwardly into the first named compartment, arrange it therein spirally, and place pressure thereon, functionally cooperative means for clearing a pathway at the rear end of the bale for the passage of a part of the tying means, and means for tying the bale.

16. In a baling mechanism, a bale forming and tying compartment, a receiving compartment for the material to be baled, an auger in the last named compartment to move the said material forwardly into the first named compartment and arrange it therein spirally, means for causing rotary motion of the auger, harpoons for moving the material being baled away from the forward end of the auger, and means for tying the bale.

17. In a baling mechanism, a bale forming and tying compartment, a receiving compartment for the material to be baled, an auger in the last named compartment to move the said material forwardly into the first named compartment and arrange it therein spirally, pivoted members mounted in conjunction with the compartments and swinging inwardly through the sides of the baling compartment to compress the matter being baled, said pivoted members being actuated by the mechanism which operates the bale-tying means, and mechanism for operating the bale-tying means and the pivoted members.

18. In a baler, a tying compartment, abutment means for holding a bale in process of formation from being moved forwardly until the bale-tying process has been completed, and bale-tying means cooperating with said abutment means in the making of the bale and comprising a needle, said bale-tying means also comprising compressor means independent of the needle cooperating with said abutment means to place and hold compression upon the bale until the knot has been completed.

19. A structure as defined by claim 4 having a guard for preventing accumulation of stalks upon the flight-reciprocating means, said guard being located above the rotary shaft and connected to the flight-reciprocating means to reciprocate therewith.

20. A baler comprising a receiving chamber, a baling chamber, an auger for conveying material from the receiving chamber to the baling chamber, mechanism for tying a bale, a metering device in connection with the bailing chamber to predetermine the amount of material in a bale, tripping means for causing the tying mechanism to function, and means mounted upon opposite sides of the bailing chamber and pivoted to swing inwardly and toward the discharge end of the baler to compress the stalks in the baling chamber.

21. A structure for the purpose indicated, comprising a receiving hopper for vegetable stalks to be baled, a baling chamber to which said stalks are forced from the receiving hopper and in which they are arranged helically, a needle mounted in connection with the baling chamber to operate in conjunction therewith to tie said stalks into bales, and means operating in directions opposite to each other to compress said stalks into a tight bale prior to the tying operation.

22. A structure for the purpose indicated, comprising receiving and compacting chambers for vegetable matter, means therein for arranging the bulk of such matter in positions substantially perpendicular to the lengthwise dimension of the chambers and compacting such matter, other compacting means cooperating with the first mentioned means in compressing the bale prior to the tying thereof, and a needle for use in tying said matter into a bale, the first mentioned compacting means comprising means for moving the arranged vegetable matter into position adjacent the tying mechanism.

23. In a baling mechanism, a bale forming and tying compartment, a receiving compartment for the material to be baled, means to move the material from the receiving compartment to the tying compartment and to arrange it in the tying compartment helically and to compress said material preliminary to tying same, and means for further compressing said material in preparation for tying same into a bale.

24. A stalk baler of the general nature indicated comprising a tubular member for receiving and forming the stalks into a bale, means for conveying the stalks from the point where received to the location where baled, a generally U-shaped needle-carrying arm having the ends of its arms pivotally mounted on said tubular member and adapted to be actuated to carry a needle through said tubular member, a needle carried by said arm and forced through the tubular member, mechanism for actuating said needle-carrying arm, and means to swing across the delivery end of the tubular member and serve as abutments against which the stalks may be pressed during the tying operation, said means being operatively connected to the actuating mechanism to be operated thereby.

25. A structure for the purpose indicated comprising receiving and compacting chambers for the stalks of vegetable matter coming from a threshing mechanism, means therein for arranging such stalks in approximate parallelism with relation to each other and compacting such matter into a bale, and a needle for use in tying said matter into a bale, said needle being operated by the operating means for the arranging means.

GEORGE INNES.